Jan. 5, 1932.  C. E. WHIPPLE ET AL  1,839,626
FRUIT GUARD FOR STRAPPING MACHINES
Filed Jan. 28, 1930  2 Sheets-Sheet 1
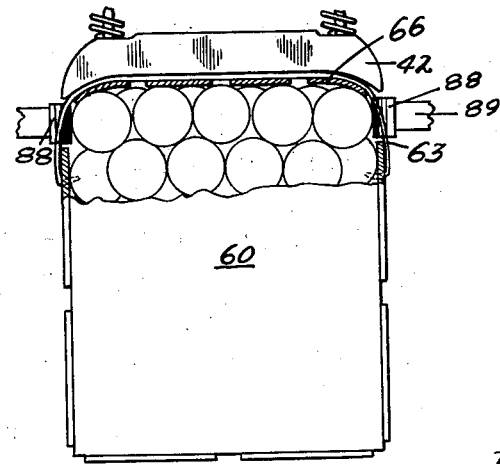
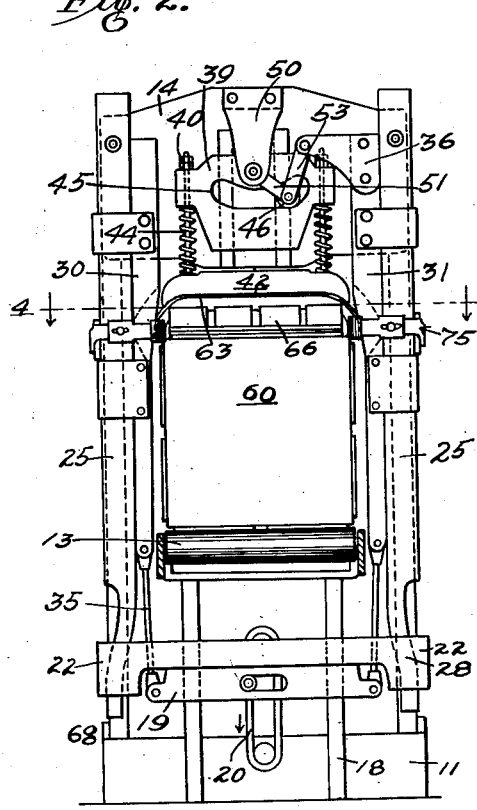
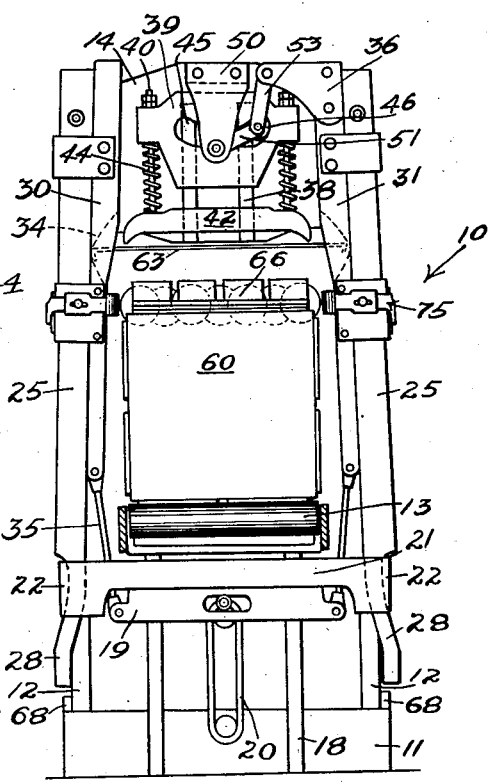
Inventors:
CHARLES E. WHIPPLE
ST. ELMO ROSS
By
Attorney Jan. 5, 1932.  C. E. WHIPPLE ET AL  1,839,626
FRUIT GUARD FOR STRAPPING MACHINES
Filed Jan. 28, 1930  2 Sheets-Sheet 2

Inventors:
CHARLES E. WHIPPLE
ST. ELMO ROSS
By
Attorney

Patented Jan. 5, 1932

1,839,626

UNITED STATES PATENT OFFICE

CHARLES E. WHIPPLE AND ST. ELMO ROSS, OF SANTA PAULA, CALIFORNIA, ASSIGNORS TO THE ESTATE OF GEORGE D. PARKER; CLARA B. PARKER, EXECUTRIX, OF RIVERSIDE, CALIFORNIA

FRUIT GUARD FOR STRAPPING MACHINES

Application filed January 23, 1930. Serial No. 423,940.

Our invention relates to apparatus for lidding and strapping packed boxes of fruit prior to shipping these to market.

In the fruit industry a greater portion of each crop is wrapped in paper, packed in shipping boxes, lidded and shipped long distances to market. In the citrus industry it is customary to apply a strap transversely across the middle of the lid. Until recently this strap was applied by hand and fastened in place by nails driven through its ends into the partition of the box. There has been recently developed a machine for applying a strap which is made of wire with the ends pointed and turned inwardly so as to extend into the box partition and hold the strap in place. This machine is disclosed in the patent to G. D. Parker, 1,715,780, issued June 4, 1929. This machine applies straps at much less cost than the hand method.

When strapping by hand, however, the operator always made sure that the fruit was pressed in under the edges of the lid prior to applying a strap, which curves the outer edges of the lid downwardly around this fruit. As the strapping machine is frequently operated automatically in conjunction with a lidding machine, and is not attended by an operator, the fruit along opposite side edges of the lid have, in many cases, been found damaged because this fruit has not been pressed in prior to and during the application of the strap.

It is an object of our invention to provide a means for pressing the upper rows of fruit along the sides of each box inwardly prior to the strapping operation of the above mentioned strapping machine so that the disadvantage noted may be eliminated.

The manner of accomplishing the foregoing objects, as well as further objects and advantages, will be made manifest in the following description and in the accompanying drawings, in which:

Figs. 1 and 2 are diagrammatic cross sectional views of the above mentioned strapping machine with a preferred embodiment of our invention applied thereto.

Fig. 3 is an end elevational view of an orange box partly broken away illustrating a step in the strapping operation which follows that illustrated in Fig. 2.

Figure 4:
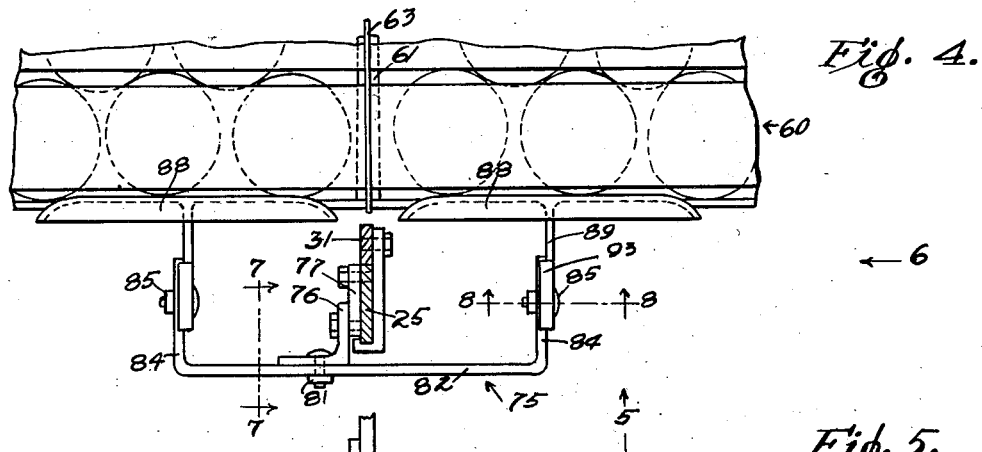
Fig. 4 is a fragmentary horizontal sectional view taken on the line 4—4 of Fig. 2 and illustrating the completion of the strapping operation but partially completed in Fig. 2.
Figure 5:
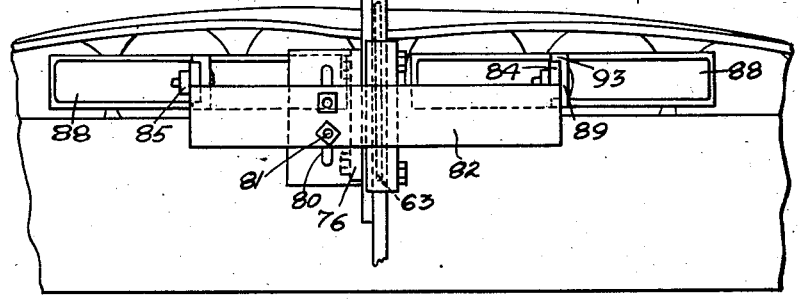
Fig. 5 is a fragmentary side elevational view taken in the direction of the arrow 5 in Fig. 4.
Figure 6:
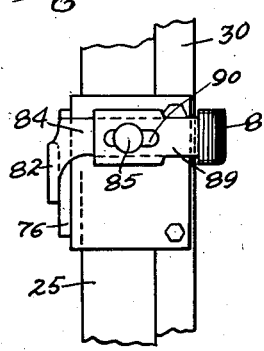
Fig. 6 is a fragmentary elevational view of the preferred embodiment of our invention taken in the direction of the arrow 6 in Fig. 4.
Figure 8:
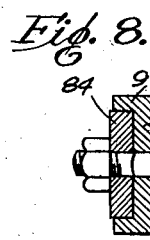
Figure 7:
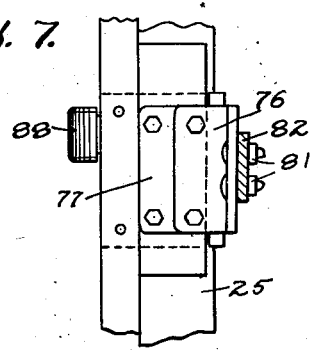

Figs. 7 and 8 are vertical sectional views taken on lines 7—7 and 8—8 respectively in Fig. 4.

Figure 9:
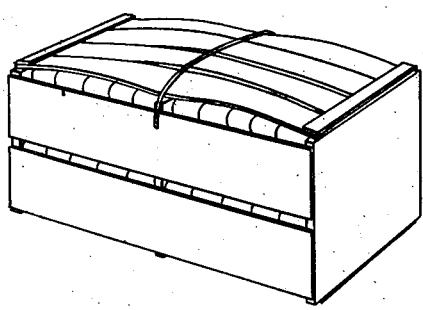

Fig. 9 is a perspective view of a box of oranges after having been lidded and strapped by a strapping machine equipped with our invention.

Having referred to the above-noted patent for a full disclosure of the strapping machine with which our invention is preferably associated, the drawings and description relating to this machine are diagrammatic in nature so as to simplify the present specification.

Figs. 1 and 2 show a strapping machine 10 which has a base frame 11 and side frame members 12, which support a box conveyer 13 and a central frame tie 14. Provided on the frame 11 are suitable driving cross head guides 18 on which a driving cross head 19 is adapted to be operated by a chain 20. Resting upon the cross head 19, adapted to rise and fall therewith to a certain extent when this is operated, is a lock bar 21 having sliding gibs 22 at its opposite ends. The central frame tie 14 pivotally supports at opposite sides of the machine a pair of drive bar guides 25 lower ends of which provide oblique arms 28 which extend through the gibs 22 as shown.

Slidably mounted upon the drive bar guides 25 are drive bars 30 and 31, the lower ends of these drive bars being connected by links 35 to opposite ends of the cross head 19. The drive bars 30 and 31 are provided medially with pockets 34 for a purpose to be described later. Provided on the upper end of the drive bar 31 is a bracket 36 for a purpose which will be made evident later.

The central frame tie 14 is provided with vertical guide tracks 38 upon which a cross head 39 is adapted to slide vertically. The cross head 39 supports, by means of bolts 40, a shaper 42 which is yieldably spaced below the cross head 39 by springs 44 disposed about the bolts 40. Provided in the cross head 39 is a cam slot 45 in which is received a roller 46. Extending downward from the central frame tie 14 is a radius link bracket 50 which pivotally supports at its lower end a radius link 51 the free end of which is connected pivotally to the roller 46 and to a connecting rod 53 which in turn is pivoted to the inner end of the bracket 36.

In the operation of the strapping machine 10 as thus described without the application of our invention, a trip (not shown) is actuated by the operator so as to cause the chain 20 to make a single rotation, which results in the cross head 19 making a single reciprocation downwardly and return to the position in which it is shown in Fig. 1. This results in the lock bar 21 dropping downwardly a distance until the gibs 22 have acted upon the oblique arms 28 so as to swing the drive bar guides 25 about their upper pivoted ends, thus bringing the drive bars 30 and 31 close to the sides of a box 60 disposed on the conveyer 13 opposite a middle partition 61 of this box. Mechanism (not shown) is provided for feeding a strap 63 into position as shown in Fig. 1 with its ends extending into the pockets 34 prior to the commencing of the strapping operation.

As the drive bars 31 move downwardly the roller 46 is moved down in the cam slot 45 so as to move the cross head 39 and the shaper 42 downward directly over the strap 63. This movement of the shaper 42 is so timed that the guide bars 25 are moved into their inner position just prior to the contact of the shaper 42 with the lid 66 of the box 60 as is shown in Fig. 2. At the lowermost point of its movement the lock bar 21 is adapted to rest upon supports 68 provided for this purpose opposite the lower ends of the oblique arms 28 so as to lock these arms and the guides 25 on which they are formed in their inwardmost positions. During the last part of the down movement of the drive bars 31 the shaper 42 presses down a middle portion of the lid 66 so as to properly shape this and presses the strap 63 into contact with the lid as is shown in Fig. 3. The final movement of the drive bar 31 brings the upwardmost portion of the pockets 34 opposite the bent ends of the strap 63 so that these ends are driven into the partitions 61 as shown in Fig. 3.

Our invention is associated with the strapping machine just described in the following manner.

The preferred embodiment of our device includes a pair of double fruit guards 75, each of which is mounted upon an edge of one of the driver bar guides 25 as shown. Each of the double guards 75 includes an angle iron bracket 76 which is bolted to a bracket 77 normally disposed on a middle portion of each drive bar guide 25. The bracket 76 is provided with an upright slot 80 through which two bolts 81 extend so as to secure to the bracket 76 a horizontal back plate 82 so that this plate is vertically adjustable on the bracket 76. The back plate 82 is formed of spring metal for a purpose which will be made evident hereinafter. Extending inwardly from opposite ends of the plate 82 are bars 84 each of which is provided with one or more holes for receiving bolts 85. Mounted upon each of the bars 84 is a guard member 88, each of which is provided with a horizontal supporting arm 89 having a slot 90 provided to receive one of the bolts 85 and guide ears 93 which extend over upper and lower edges of the bars 84 so as to keep the supporting arms 89 in alignment with the bars 84 at all times. Opposite ends of each of the guards 88 are curved and the inner faces and ends of these bars are polished so as not to injure wrapped fruit contacted by these guards.

The operation of the strapping machine 10 is in no way changed from that described above when our invention is applied to this machine. The guards 88, however, of the double guards 75 are moved in by the initial movement of the drive bar guides 25 so that prior to contact of the lid by the shaper 42 the guards 88 are positioned as shown in Fig. 2 with their inner faces opposite the outer edges of the box lid 66. This pushes the outer upper rows of fruit disposed in the box 60 into upward positions so that when the shaper contacts the lid and the strap is applied as shown in Fig. 3, this fruit cannot be injured by downward bending of the edges of the lid 66. Owing to the springy nature of the back plates 82 of the double guard 75, the guard members 88 yield slightly to the fruit against which they come in contact, thus preventing damage where the fruit is packed tightly in the box. As the gibs 22 are raised on the oblique arms 28 when the cross head 19 returns to its upward position, the guards 88 are drawn outwards so that they in no wise engage box 60, the lid, or the fruit therein when this box is shoved along the conveyer 13 out of the strapping machine 10.

One of the great advantages of our invention in operation is that the appearance of the packed boxes when these reach the market is greatly enhanced owing to the fact that fruit which would otherwise be squeezed and caused to bulge outwardly and thereby tend to have the wrappers torn therefrom and the fruit mashed, is disposed well

What we claim is:

1. In an automatic crate strapping machine the combination of: lid shaping means; strap applying means; and means automatically pressing fruit extending above the sides of said crate inward just prior to the operation of said shaping means and said strap applying means.

2. In an automatic crate strapping machine the combination of: lid shaping means; strap applying means; including strap drivers and guides therefor; means for moving said drivers and guides in towards a box prior to the applying of a strap to said box by said drivers; and means mounted on said guides for pressing fruit extending above the sides of said crate inward prior to the operation of said shaping means and said strap applying means.

3. In an automatic crate strapping machine the combination of: lid shaping means; strap applying means; and means pressing fruit extending above the sides of said crate inward prior to the operation of said shaping means and said strap applying means, said fruit pressing means including yieldably positioned guard members disposed substantially parallel to the direction of travel of said box through said strapping device.

4. In an automatic crate strapping machine the combination of: lid shaping means; strap applying means, including strap drivers and guides therefor; means for moving said drivers and guides in towards a box prior to the applying of a strap to said box by said drivers; and means mounted on said guides for pressing fruit extending above the sides of said crate inward prior to the operation of said shaping means and said strap applying means, said fruit pressing means including yieldably positioned guard members disposed substantially parallel to the direction of travel of said box through said strapping device.

5. In an automatic crate strapping machine the combination of: means for shaping a middle portion of the lid of a box; means automatically operable prior to said shaping to press inwardly the fruit, along the side edges of said lid, on both sides of said middle portion thereof and hold said fruit in said position during said shaping operation; and means for automatically applying a strap to said box over the shaped portion of said lid to hold said lid in shaped condition.

6. In an automatic box strapping machine, the combination of: means for positioning a box of fruit with the fruit extending above the top of the box and with the lid applied to the box; means for pressing the side rows of fruit in the upper tier inwardly from between upper edges of the box sides and side edges of the lid; means for shaping said lid to hold said fruit as inwardly positioned; means for applying a strap to said box to hold said cover shaped in the manner aforesaid; and means for coordinately operating the aforementioned means as set forth.

7. A combination as in claim 1 in which said fruit pressing means is vertically adjustable to fit boxes of different size.

8. In an automatic box strapping machine, the combination of: lid shaping means; strap applying means including strap drivers and guides therefor; means for moving said strap driver guides towards the box prior to the securing of a strap to said box by said strap drivers; and means connected to said guides and operated coordinately therewith for pressing in fruit extending above the sides of said box prior to the operation of said shaping means and said strap applying means.

9. In an automatic box strapping machine, the combination of: box positioning means; a strap applying means disposed transversely of a box so positioned; means for driving opposite ends of said strap into said box; guides for said driving means; means for moving said guides inward against said box prior to the operation of said driving means; a fruit guard divided medially to make room for said driving means and supported on said guides for tucking the fruit when said guides move inwardly toward said box; and means for coordinately and automatically operating the aforementioned means.

10. A combination as in claim 9 in which said guard means consists of a spring steel back plate and guard members mounted upon opposite ends of said back plate to extend toward said box.

11. A combination as in claim 9 in which said guard means consists of a spring steel back plate and guard members mounted upon opposite ends of said back plate to extend toward said box, said guard members being adjustable on the ends of said back plate.

12. A combination as in claim 9 in which said guard means consists of a spring steel back plate and guard members mounted upon opposite ends of said back plate to extend towards said box, said guard members being adjustable on the ends of said back plate and said back plate being adjustable vertically on said guide means.

In testimony whereof we have hereunto set our hands at Santa Paula, California, this 31st day of December, 1929.

CHARLES E. WHIPPLE.
ST. ELMO ROSS.